United States Patent
Pazhyannur et al.

(10) Patent No.: US 11,166,205 B2
(45) Date of Patent: Nov. 2, 2021

(54) NEIGHBOR LISTS FOR USE IN MULTI-OPERATOR CORE NETWORK BASED NEUTRAL HOST NETWORKS

(71) Applicant: Cisco Technology, Inc., San Jose, CA (US)

(72) Inventors: Rajesh S. Pazhyannur, Fremont, CA (US); Shailender Potharaju, Fremont, CA (US); Anal Srivastava, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 18 days.

(21) Appl. No.: 16/691,936

(22) Filed: Nov. 22, 2019

(65) Prior Publication Data

US 2021/0160743 A1    May 27, 2021

(51) Int. Cl.
| | |
|---|---|
| H04W 4/00 | (2018.01) |
| H04W 36/00 | (2009.01) |
| H04W 36/04 | (2009.01) |
| H04W 24/02 | (2009.01) |
| H04W 36/08 | (2009.01) |

(Continued)

(52) U.S. Cl.
CPC ....... *H04W 36/0061* (2013.01); *H04W 16/32* (2013.01); *H04W 24/02* (2013.01); *H04W 36/0083* (2013.01); *H04W 36/04* (2013.01); *H04W 36/08* (2013.01); *H04W 48/16* (2013.01); *H04W 76/27* (2018.02); *H04W 84/045* (2013.01)

(58) Field of Classification Search
CPC .... H04Q 36/0061; H04Q 16/32; H04Q 24/02; H04Q 36/0083; H04Q 36/04; H04Q 36/08; H04Q 48/16
See application file for complete search history.

(56) References Cited

U.S. PATENT DOCUMENTS

| | | |
|---|---|---|
| 8,125,956 B2 | 2/2012 | Reddy et al. |
| 8,437,754 B2 | 5/2013 | Kubota et al. |

(Continued)

OTHER PUBLICATIONS

Kyung Mun, "CBRS Opens New Managed Services Opportunity", Mobile Experts LLC., Ruckus Wireless White Paper, Feb. 2017, 9 pages.

(Continued)

*Primary Examiner* — Erika A Washington
(74) *Attorney, Agent, or Firm* — Edell, Shapiro & Finnan, LLC

(57) ABSTRACT

A radio access network (RAN) of a neutral host network (NHN) provides communications in a plurality of small cells, and is a shared resource with shared access by a plurality of mobile network operators (MNOs) via a multi-operator core network (MOCN). A base station maintains a neighbor list of small cell frequencies of neighboring small cells of a small cell, and broadcasts, to a user equipment (UE), a system information message which includes the neighbor list. The base station additionally maintains a plurality of operator-specific neighbor lists of one or more macro-cell frequencies of one or more neighboring macro-cells, where each such list is associated with a respective one of a plurality of macro-cellular networks of the MNOs. The base station transmits, to the UE, a message including a selected one of the operator-specific neighbor lists associated with an identified one of the mobile network operators of the UE.

20 Claims, 9 Drawing Sheets

(51) Int. Cl.
  *H04W 16/32* (2009.01)
  *H04W 48/16* (2009.01)
  *H04W 84/04* (2009.01)
  *H04W 76/27* (2018.01)

(56) References Cited

U.S. PATENT DOCUMENTS

| | | | |
|---|---|---|---|
| 9,282,465 | B2 | 3/2016 | Grayson et al. |
| 9,432,906 | B2 | 8/2016 | Patil et al. |
| 10,440,639 | B1 | 10/2019 | Vivanco et al. |
| 2008/0113670 | A1 | 5/2008 | Dufour et al. |
| 2009/0098871 | A1* | 4/2009 | Gogic ............... H04W 48/18 455/435.1 |
| 2012/0214495 | A1* | 8/2012 | Choi ............... H04W 36/0072 455/444 |
| 2013/0034081 | A1* | 2/2013 | Ban ............... H04W 36/16 370/331 |
| 2013/0064182 | A1 | 3/2013 | Zhu |
| 2013/0295915 | A1 | 11/2013 | Nakamata et al. |
| 2013/0313709 | A1 | 11/2013 | Watanabe et al. |
| 2016/0165494 | A1 | 6/2016 | Warburton et al. |
| 2018/0368000 | A1 | 12/2018 | Ahmavaara et al. |
| 2019/0021051 | A1 | 1/2019 | Joseph et al. |

OTHER PUBLICATIONS

Above Ground Level, "HetNet The Future is Now", AGL Small Cell Magazine, vol. 1, Issue 1, Mar. 2014, 40 pages, aglmediagroup.com.
Mohammad T. Kawser et al., "Multiple Neighbor Cell Lists in the same cell for LTE", Research Gate, Jun. 2011, 7 pages.
Atis, "Neutral Host Solutions for 5G Multi-Operator Deployments in Managed Spaces", ATIS-I-0000073, Jul. 1, 2019, 49 pages.

* cited by examiner

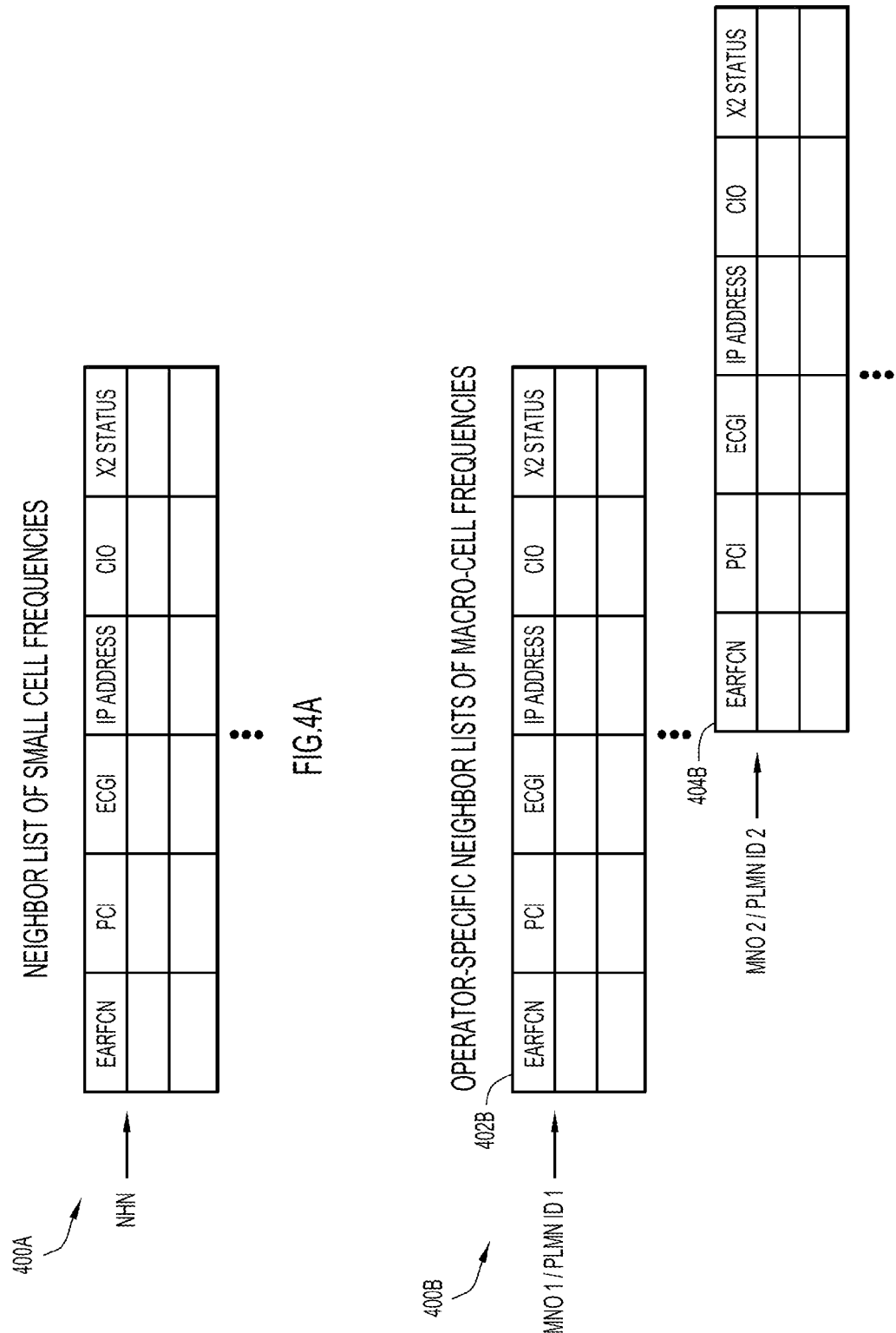

NEIGHBOR LISTS FOR USE IN MULTI-OPERATOR CORE NETWORK BASED NEUTRAL HOST NETWORKS

TECHNICAL FIELD

The present disclosure relates generally to communication systems, and more particularly to neighbor lists for use in multi-operator core network (MOCN) based neutral host networks (NHNs).

BACKGROUND

A user equipment (UE) may operate for communications in one of a plurality of Public Land Mobile Networks (PLMNs) (or macro-cellular networks) associated with one of a plurality of different Mobile Network Operators (MNOs). In order to provide extended or enhanced coverage, each one of the MNOs may be provided with shared access to one or more Radio Access Networks (RANs) of a Neutral Host Network (NHN) in a Multi-Operator Core Network (MOCN).

The RANs of the NHN may provide for communications in a shared spectrum of a Citizens Broadcast Radio Services (CBRS) band. Spectrum sharing in a CBRS-based network is facilitated by a Spectrum Access System (SAS) which is configured to authorize and manage the use of spectrum of CBRS base stations in different CBRS networks.

In such an environment, issues relating to mobility of a UE between the shared RAN of the NHN and a macro-cellular network may arise.

BRIEF DESCRIPTION OF THE DRAWINGS

FIG. 2) according to some implementations of the present disclosure, especially suitable for small cell to macro-cell handover of a UE;

FIG. 2) according to some implementations of the present disclosure, especially suitable for small cell to macro-cell handover of a UE;

FIG. 4A is an illustrative representation of an example of a neighbor list of small cell frequencies associated with neighboring small cells according to some implementations of the present disclosure;

FIG. 4B is an illustrative representation of an example of a plurality of operator-specific neighbor lists of macro-cell frequencies associated with one or more neighboring macro-cells according to some implementations of the present disclosure;

DESCRIPTION OF EXAMPLE EMBODIMENTS

Figure 1:
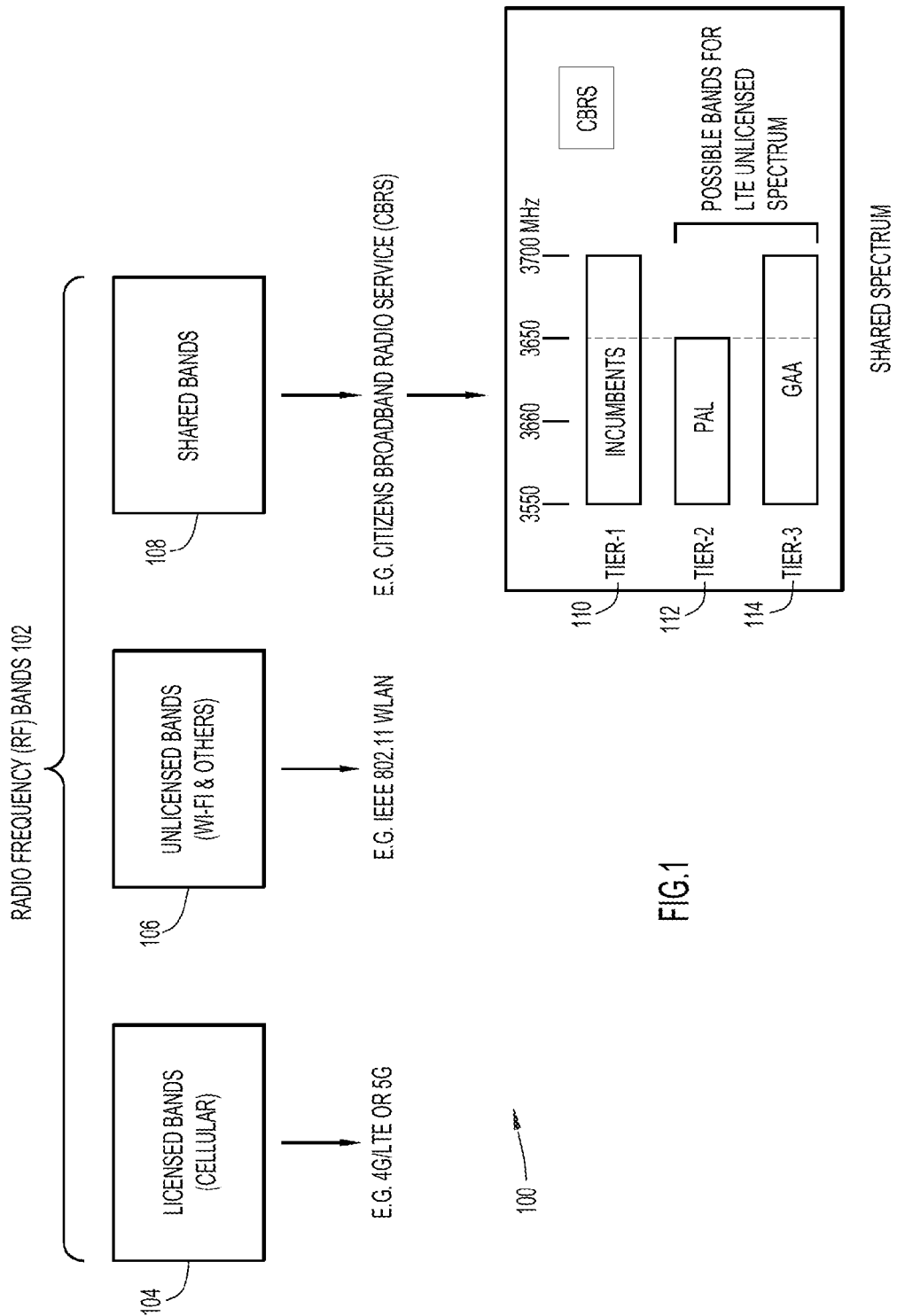
FIG. 1 is a reference diagram for describing radio frequency (RF) bands used for radio communications for mobile devices or user equipments (UEs)

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques and mechanisms of the present disclosure are for use by a base station configured for use in a Radio Access Network (RAN) of a Neutral Host Network (NHN), where the RAN is operative to provide communications in a plurality of small cells and comprises a shared resource with shared access by a plurality of MNOs via a Multi-Operator Core Network (MOCN).

In one illustrative example, a base station or controller thereof may maintain a neighbor list of small cell frequencies of neighboring small cells of a small cell of the base station, for a user equipment (UE) operative in the small cell of the base station. The base station may broadcast, to the UE operative in the small cell, a system information message which includes the neighbor list of small cell frequencies. The base station or controller thereof may additionally maintain a plurality of operator-specific neighbor lists of one or more macro-cell frequencies of one or more neighboring macro-cells, where each operator-specific neighbor list is associated with a respective one of a plurality of macro-cellular networks of the MNOs. The base station may transmit, to the UE operative in the small cell, a message including a selected one of the operator-specific neighbor lists associated with an identified one of the MNOs of the UE. The selected operator-specific neighbor list may be used for small cell to macro-cell handover for the UE (i.e. during UE operation in a connected mode). In some implementations, the message including the selected operator-specific neighbor list is transmitted to the UE in a radio resource control (RRC) connection reconfiguration message.

More detailed and alternative techniques and implementations are provided herein as described below.

Example Embodiments

As described in the Background section, a user equipment (UE) may operate for communications in one of a plurality of different Public Land Mobile Networks (PLMNs) (or macro-cellular networks) associated with one of a plurality of different Mobile Network Operators (MNOs). In order to provide extended or enhanced coverage, each one of the MNOs may be provided with shared access to one or more Radio Access Networks (RANs) of a Neutral Host Network (NHN) via a Multi-Operator Core Network (MOCN). The RANs may provide for communications in a shared spectrum of a Citizens Broadcast Radio Services (CBRS) band. Spectrum sharing in a CBRS-based network is facilitated by a spectrum access system (SAS) which is configured to authorize and manage the use of spectrum of CBRS base stations in different CBRS networks. In such an environment, issues relating to mobility of a UE between the shared RAN of the NHN and the macro-cellular network may arise.

To better explain in relation to the drawings, FIG. 1 is a reference diagram 100 for describing radio frequency (RF) bands 102 used for radio communications for UEs. RF bands 102 may include licensed bands 104 for Third Generation Partnership Project (3GPP) or macro-cellular networks (e.g. 4G or Long-Term Evolution "LTE" or Fifth Generation "5G" networks), unlicensed bands 106 for non-3GPP or Wi-Fi networks (e.g. Institute of Electrical and Electronics Engineers "IEEE" 802.11 Wireless Local Area Networks "WLANs"), and shared bands 108 (e.g. for CBRS).

CBRS provides for use of a 150 MHz-wide broadcast band in the 3550-3700 MHz frequency range, i.e. Time Division (TD) LTE (TD-LTE) band "48." There are three types of users allowed to access this spectrum, including incumbent users, Priority Access License (PAL) users, and General Authorized Access (GAA) users. The SAS serves to protect incumbents from interference from lower-tier PAL and GAA users, and protects PAL users from interference from other PAL and GAA users. The SAS maintains database information of spectrum usage by incumbent, PAL, and GAA users in all census tracts (or areas) and allocates channels to base stations (also referred to as Citizens Broadband Radio Service Devices or "CBSDs") according to a variety of rules.

For example, a Tier-1 type 110 or incumbent users (such as navy ships, military radars and fixed satellite service earth stations) are allocated access to all the channels. A Tier-2 type 112 or PAL users are granted access in the 3550-3650 MHz band and are allowed to use a maximum of seven (7) 10 MHz channels in a census tract (or area). Here, no licensee is allowed to take more than four (4) PAL channels in a census tract. A Tier-3 type 114 or GAA users are allowed access to all the channels, but only channels that are not being used by the other above-indicated users. A SAS makes determinations based on multiple factors and informs CBSDs of allowable operating parameters (e.g. frequency band or channel and maximum Effective Isotropic Radiated Power or "EIRP") that it can use at a given point of time, to ensure compliance with regulations with the Federal Communications Commission (FCC) and other regulatory bodies.

Figure 2:
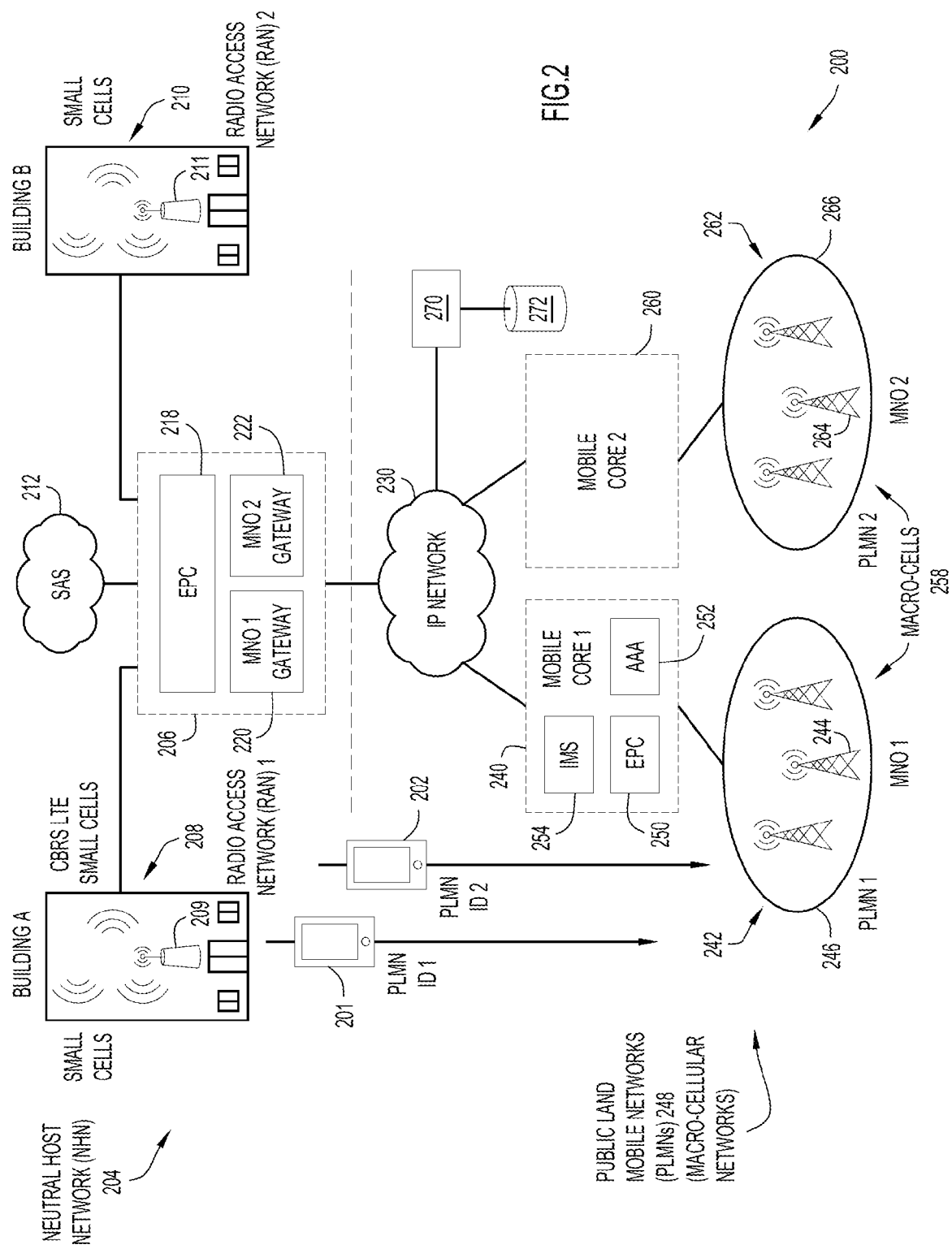
FIG. 2 is an illustrative representation of a communication system which includes a plurality of Public Land Mobile Networks (PLMNs) (or macro-cellular networks) associated with a plurality of Mobile Network Operators (MNOs), and a Neutral Host Network (NHN) including one or more Radio Access Networks (RANs) for shared access by the MNOs via a Multi-Operator Core Network (MOCN)

FIG. 2 is an illustrative representation of a communication system 200 which includes a plurality of PLMNs 248 (or macro-cellular networks) associated with a plurality of MNOs, and an NHN 204 including one or more RANs for shared access by the MNOs via a MOCN.

In the example of FIG. 2, the plurality of PLMNs 248 include a PLMN 1 of an MNO 1 and a PLMN 2 of an MNO 2. PLMN 1 of MNO 1 may be identified by a PLMN ID 1 and PLMN 2 of MNO 2 may be identified by a PLMN ID 2. In general, the plurality of PLMNs 248 provide for communications in a plurality of macro-cells 258. Each one of PLMNs 248 (i.e. PLMN 1 and PLMN 2) may include a mobile core and one or more base stations (e.g. operative in licensed spectrum). For example, PLMN 1 of MNO 1 may include a mobile core 240 and one or more base stations 242, such as a base station 244 providing communications in a macro-cell 246. Similarly, PLMN 2 of MNO 2 may include a mobile core 260 and one or more base stations 262, such as a base station 264 providing communications in a macro-cell 266. Although not illustrated in FIG. 2, the macro-cells 258 of PLMNs 1 and 2 may be overlapping or adjacent to each other; for example, macro-cell 246 of PLMN 1 may overlap with or be adjacent to macro-cell 266 of PLMN 2 (see e.g. FIGS. 5A-5C described later below).

Mobile core 240 of MNO 1 may include an Evolved Packet Core (EPC) 250 or other suitable core network technology, an Authentication, Authorization, and Accounting (AAA) server 252 (e.g. a Remote Authentication Dial-In User Service or "RADIUS" server) for authentication, and an Internet Protocol (IP) Multimedia Subsystem (IMS) 254, as well as other core components. Mobile core 260 of MNO 2 may be configured similarly or the same as mobile core 240 of MNO 1. The base stations configured to serve the macro-cells 258 may be or include, for example, eNodeBs (eNBs), gNodeBs (gNBs), and the like. These base stations may further include or be associated with controller and/or processing portions, for example, baseband units (BBUs), control units (CUs), CU user planes (CU-Us), etc., for operation and control.

Each RAN of NHN 204 may provide communications in a plurality of small cells, being a shared resource with shared access by the MNOs via the MOCN. In the example of FIG. 2, the RANs of NHN 204 include a RAN 1 providing communications in a plurality of small cells 208 in a Building A (e.g. an office building), and a RAN 2 providing communications a plurality of small cells 210 in a Building B (e.g. another office building). The plurality of small cells 208 of RAN 1 may be served by a plurality of base stations (e.g. a base station 209) (alternatively referred to as an access point or "AP"), and similarly, the plurality of small cells 210 of RAN 2 may be served by a plurality of base stations (e.g. a base station 211). The base stations configured to serve the small cells may be or include, for example, eNBs, gNBs, Home eNBs (HeNBs), Remote Radio Heads (RRHs), and the like. These base stations may include or be associated with processing and control portions, for example, CUs, CU-Us, etc., for control and communications.

In general, "small cell" networks differ from "macro-cell" networks in that small cell networks are typically comprised of multiple small cell base stations or APs, which may provide proximate coverage to users in an environment in which macro-cellular network coverage may be limited or interfered (e.g. within a building, structure, facility, etc.). Typically, radios of small cell networks operate at lower RF power levels as compared to radios of macro-cell networks, for example, to provide coverage in a business or residential environment (e.g., within a building, home, etc.) where coverage from macro-cell radios may be limited due to interference from walls, roofs, etc. Each cell may be identified using a corresponding cell identifier (cell ID). In various embodiments, the cell ID may be a Cell Global Identifier (CGI), an evolved Cell Global Identifier (eCGI), or some other identifier, which may uniquely identify a cell.

RAN 1 and RAN 2 may provide operation for communication in a shared spectrum according to a system for shared spectrum access. Accordingly, a SAS 212 utilized by the NHN 204 may be configured to authorize and manage the use of spectrum of the base stations of the small cells 208 of RAN 1 and small cells 210 of RAN 2. SAS 212 makes spectrum allocation determinations based on a variety of factors and informs the base stations of allowable operating parameters (e.g. frequency channel and EIRP) for communications.

Each one of base stations in RAN 1 and RAN 2 may have an interface for communications with a core network 206 of the NHN 204. The core network 206 may be or be based on an EPC 218 or other suitable core network technology. The core network 206 of NHN 204 may include a plurality of gateways to provide shared access for the MNOs via a public or private network (e.g. an IP network 230). For example, the core network 206 of NHN 204 may include an MNO 1 gateway 220 for access by functions of mobile core 240 of PLMN 1 of MNO 1, as well as an MNO 2 gateway 222 for access by functions of mobile core 260 of PLMN 2 of MNO 2.

In FIG. 2, a UE 201 may have a subscription for service with MNO 1 and be associated with PLMN ID 1. UE 201 may operate for communications in RAN 1 of NHN 204 and be subsequently moved out of coverage of RAN 1, being handed over to one of the PLMNs 248 associated with MNO 1/PLMN 1. On the other hand, a UE 202 may have a subscription for service with MNO 2 and be associated with PLMN ID 2. UE 202 may operate for communications in RAN 1 of NHN 204 and be subsequently moved out of coverage of RAN 1, being handed over to one of the PLMNs 248 associated with MNO 2/PLMN 2.

In some implementations, techniques and mechanisms of the present disclosure may relate to processing and/or communication of a base station for neighbor list creation and/or communications to a UE, for use in small cell to macro-cell handover of a UE. In specific implementations, techniques and mechanisms of the present disclosure relate to neighbor list creation and/or communications associated with a UE operating in a connected mode of operation for connected mode mobility.

To better explain, in LTE based networks, access stratum (AS) protocols may run between an eNB and a UE, and these protocols may determine which radio-specific procedures are in effect. Specifically, a Radio Resource Control (RRC) state of the UE may determine operation and behavior associated with the UE. There are two different RRC states in LTE, namely, RRC_IDLE and RRC_CONNECTED, referred to as an idle mode and a connected mode, respectively. In the connected mode, a radio bearer is established with the eNB; in the idle mode, no radio bearer is established. In the connected mode, the network is aware of the UE's location (i.e. the eNB) and therefore unicast communication is possible. Here, the UE may perform measurements on signals from neighboring cells (based on one or more neighbor lists) and report these measurements to the eNB. The eNB may determine whether to handover the UE and to which cell to handover.

Figure 3A:
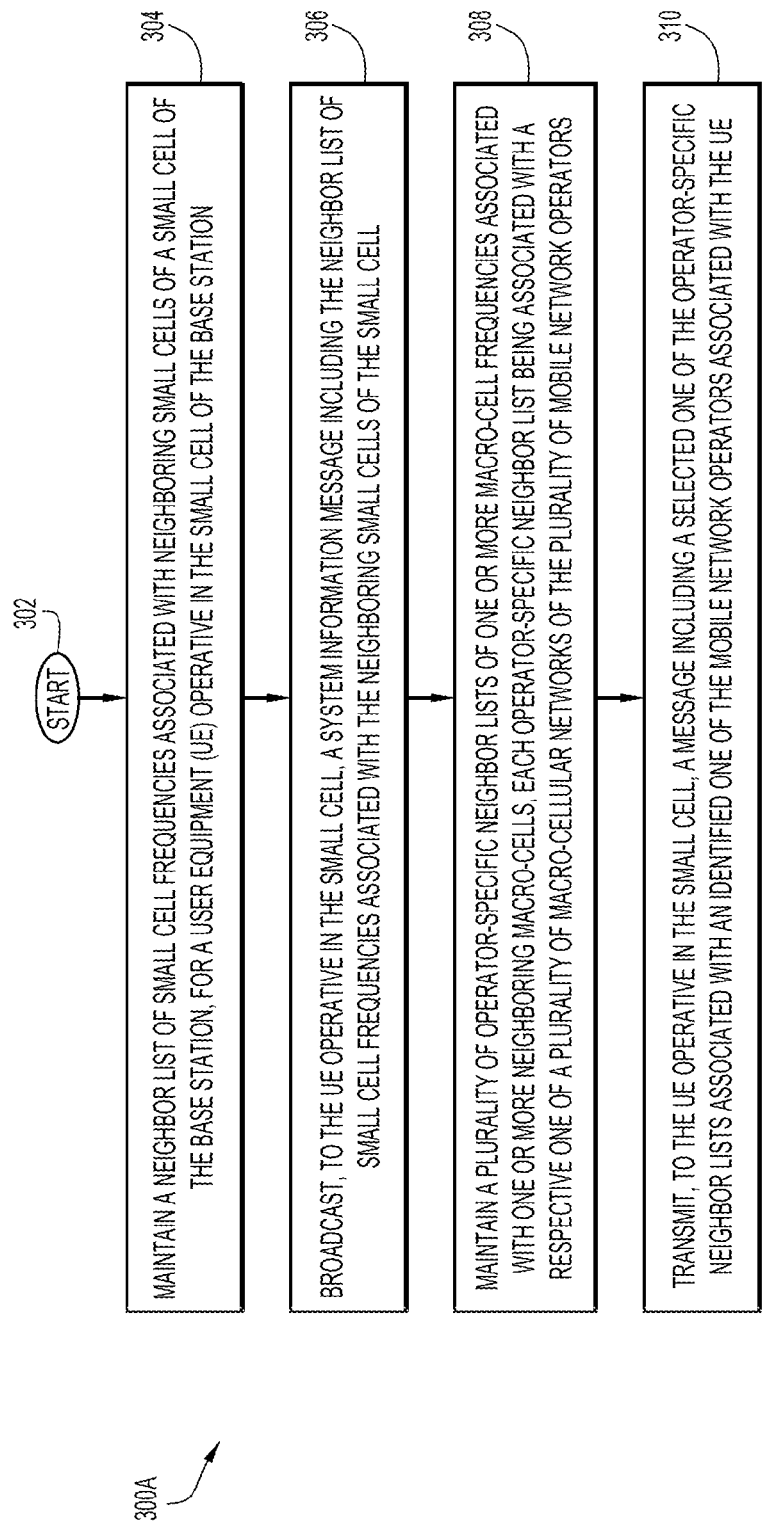
FIG. 3A is a flowchart for describing a method of a base station configured for use in a RAN of an NHN (e.g.

FIG. 3A is a flowchart 300A for describing a method of a base station configured for use in a RAN of an NHN according to some implementations of the present disclosure. The RAN may operate to provide communications in a plurality of small cells and comprise a shared resource with shared access by a plurality of MNOs via a MOCN. The method may be for use in providing small cell to macro-cell handover of a UE operating in a small cell of the base station (e.g. in a connected mode of operation). The method may be performed by a base station (or controller or control unit thereof) in the communication system described earlier in relation to FIG. 2. The method of FIG. 3A may be performed for each one of the base stations in the RAN. In some implementations, the base station may be a CBSD operative in a shared spectrum according to a system for shared spectrum access. The method may be embodied in a computer program product which includes a non-transitory computer readable medium and instructions stored in the non-transitory computer readable medium, where the instructions are executable by one or more controllers or processors of the base station.

Beginning at a start block 302 of FIG. 3A, the base station or controller thereof may maintain a neighbor list of small cell frequencies associated with neighboring small cells of the small cell (step 304 of FIG. 3A). The base station may broadcast, to the UE operative in the small cell (as well as to other UEs operative in the small cell), a system information message including the neighbor list of small cell frequencies associated with the neighboring small cells (step 306 of FIG. 3A).

The base station or controller thereof may additionally maintain a plurality of operator-specific neighbor lists of one or more macro-cell frequencies associated with one or more neighboring macro-cells (step 308 of FIG. 3A). Each operator-specific neighbor list may be associated with a respective one of a plurality of macro-cellular networks of the plurality of MNOs. The different operator-specific neighbor lists may be associated with different UEs according to the MNO associated with each UE. The one or more neighboring macro-cells in each operator-specific neighbor list may be characterized such that a macro-coverage area of a neighboring macro-cell may overlap with or be adjacent to a small-cell coverage area of the small cell. Note that frequencies bands of macro-cellular networks of different MNOs may be different or substantially different from each other (e.g. PLMN 1 of MNO 1 may operate in 700 MHz band and PLMN 2 of MNO 2 may operate in 2100 MHz band).

At the base station or controller thereof, the MNO associated with the UE may be known or identified, and one of the operator-specific neighbor lists may be selected based on the known or identified MNO of the UE. The base station may transmit, to the UE operative in the small cell, a message including the selected one of the operator-specific neighbor lists associated with the identified one of the MNOs associated with the UE (step 310 of FIG. 3A). Note that step 310 of FIG. 3A may be performed for each one of the UEs operating in the small cell of the base station.

Accordingly, the UE(s) may receive the messages from step 306 and 310, perform measurements on signals from neighboring cells based on the neighbor lists, and report these measurements to the base station which determines whether to handover the UE and to which cell (whether small cell or macro-cell) to handover.

In some implementations, in step 306, the system information message which includes the neighbor list of small cell frequencies may be broadcasted in a system information block (SIB), which may be of SIB type 4 ("SIB4") and/or SIB type 5 ("SIB5"). In typical implementations, SIB4 includes intra-frequency neighbors (i.e. on the same frequency) and SIB5 includes inter-frequency neighbors (i.e. on a different frequency). Also, as a single small cell may be associated with a plurality of PLMNs or MNOs, a system information message may further include a list of PLMN IDs associated with the multiple PLMNs in a SIB type 1 ("SIB1") of the system information message.

In some implementations, in step 310, the message which includes the selected one of the operator-specific neighbor lists may be an RRC connection reconfiguration message, a message which configures UE measurement reporting. The message could also be or be referred to as a measurement control message.

In some implementations, the RRC connection reconfiguration message for a UE may be sent to a UE in response to detection of a predetermined event. In LTE, a plurality of predefined measurement reporting events are defined; in particular, five (5) intra-system measurement reporting events and two (2) inter-system measurement reporting events are defined. The intra-system measurement reporting events may include events A1, A2, A3, A4, and A5 which are based on Reference Signal Received Power (RSRP) or Reference Signal Received Quality (RSRQ) messages. In particular, an event A5 is triggered when a serving cell of the UE becomes worse than a first threshold value and a neighboring cell becomes better than a second threshold value. In particular implementations, the RRC connection reconfiguration message of step 310 may be sent to a UE in response to detection of a predetermined event which is an event A5.

Referring ahead to FIG. 4A, what is shown is an illustrative representation of an example of a neighbor list 400A of small cell frequencies associated with neighboring small cells according to some implementations. In some implementations, the neighbor list 400A of small cell frequencies may be and be referred to as an NHN-specific neighbor list of small cell frequencies. This neighbor list 400A of small cell frequencies may be common to all UEs in the small cell. Each entry in the neighbor list 400A of small cell frequencies may include a frequency channel number of a neighboring small cell. In some implementations as further indicated in FIG. 4A, each entry may further include one or more of a physical cell identity of the neighboring small cell, a CGI of the neighboring small cell, a cell individual offset (or "CIO") of the neighboring small cell, an IP address associated with the neighboring small cell, and an X2 connection status indicator associated with the neighboring small cell. In CBRS/LTE, the frequency channel may be an E-UTRA ("Evolved Universal Terrestrial Radio Access") Absolute Radio Frequency Channel Number or "EARFCN," where E-UTRA refers to Evolved Universal Mobile Telecommunications System or "UMTS" Terrestrial Radio Access. In LTE, the carrier frequency in the uplink and downlink may be designated by the EARFCN, which ranges between 0-65535. The cell identifier may be a Physical Cell ID (PCI) which is an identifier of a network cell in the physical layer.

Referring now to FIG. 4B, what is shown is an illustrative representation of an example of a plurality of operator-specific neighbor lists 400B of macro-cell frequencies associated with one or more neighboring macro-cells according to some implementations. Thus, these neighbor lists are separated on an operator-by-operator basis. In the example of FIG. 4B, the plurality of operator-specific neighbor lists 400B is shown to include two (2) operator-specific neighbor lists, and more specifically, an operator-specific neighbor list 402B of macro-cell frequencies associated with MNO 1/PLMN 1 and an operator-specific neighbor list 404B of macro-cell frequencies associated with MNO 2/PLMN 2. In some implementations, each operator-specific neighbor list 402B and 404B may be stored in association with a (unique) PLMN ID of the MNO. In addition, each entry in each operator-specific neighbor list 402B and 404B may include a frequency channel number of a neighboring macro-cell. In some implementations as further indicated in FIG. 4B, each entry may further include one or more of a physical cell identity of the neighboring macro-cell, a cell global identity (or "CGI") of the neighboring macro-cell, a cell individual offset (or "CIO") of the neighboring macro-cell, IP address associated with the neighboring macro-cell, and an X2 connection status indicator associated with the neighboring macro-cell. In CBRS/LTE, the frequency channel may be an EARFCN and the cell identifier may be a PCI which is an identifier of a network cell in the physical layer.

The MNO of the UE may be identified by the PLMN ID associated with the UE. The PLMN ID may be identified from an International Mobile Subscriber Identity (IMSI) of the UE. The IMSI of a UE is a combination of the PLMN ID of the UE and a Mobile Station Identification Number (MSIN) of the UE, where the PLMN ID is a combination of a Mobile Country Code (MCC) and Mobile Network Code (MNC) of the PLMN. While gaining network access via the RAN, the UE may transmit a message indicating an attach request for registration and include the IMSI of the UE. This message which includes the IMSI may be received by the base station or network. Accordingly, the base station or network may obtain the IMSI of the UE from the message indicating the attach request. Once the PLMN ID of the UE is obtained, the operator-specific neighbor list of the UE may be selected based on identifying a match between the identified PLMN ID associated with the UE and the PLMN ID stored in association with the operator-specific neighbor list.

As described above, different operator-specific neighbor lists may be transmitted to different UEs according to the MNO associated with each UE. For example, the base station may transmit, to the UE operative in the small cell, a first message including a first selected one of the operator-specific neighbor lists associated with a first identified one of the MNOs associated with the UE, and further transmit, to another UE operative in the small cell, a second message including a second selected one of the operator-specific neighbor lists associated with a second identified one of the MNOs associated with the other UE, and so on.

Figure 5A:
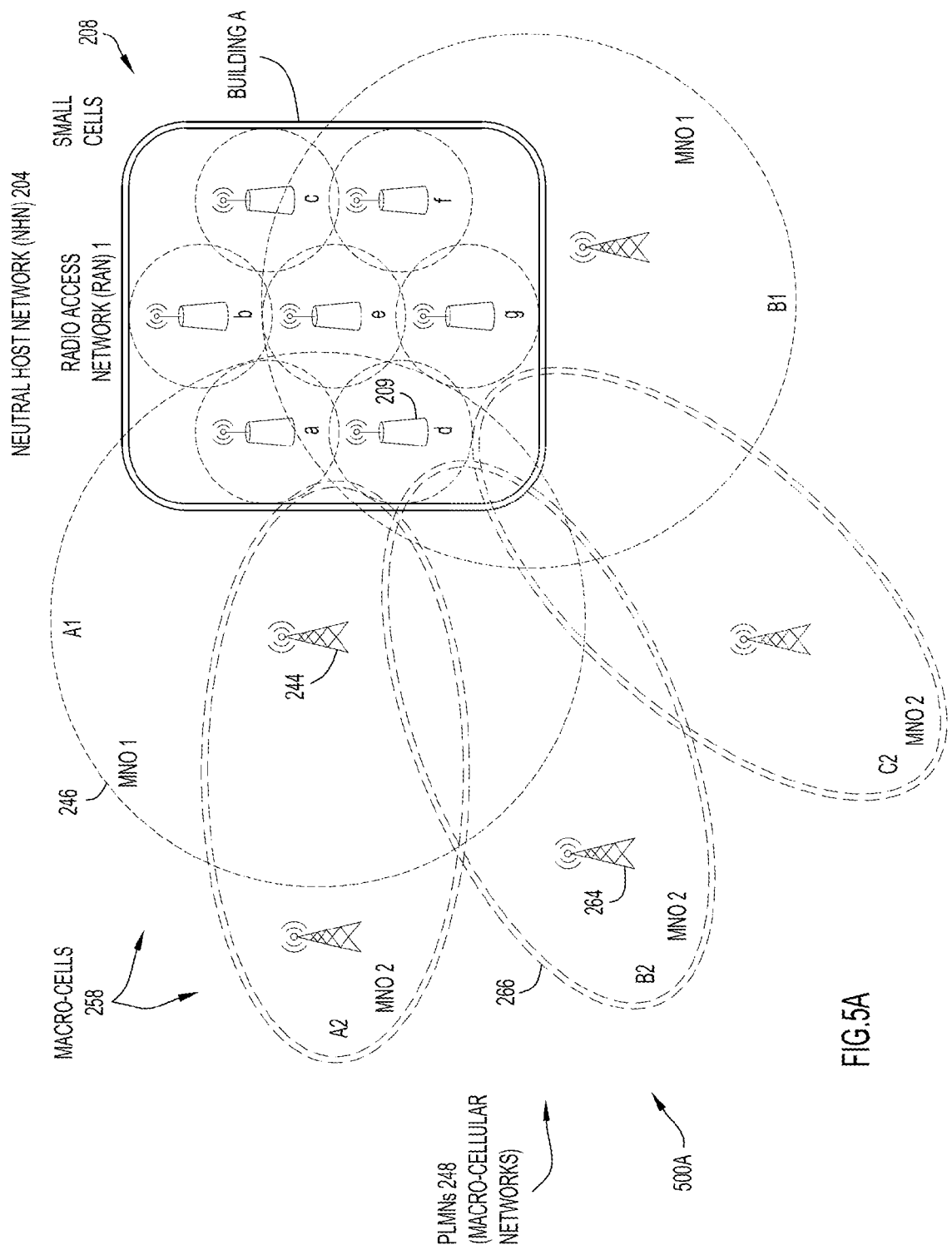
FIG. 5A is an illustrative representation of a generally top down view of a select relevant portion of the communication system including the RAN of the NHN of FIG. 2.

To better explain with reference ahead to FIG. 5A, what is shown is an illustrative representation 500A of a generally top down view of a select relevant portion of the communication system including the RAN 1 of NHN 204 of FIG. 2. RAN 1 of NHN 204 of FIG. 5A is shown to include a plurality of small cells 208 which include small cells a, b, c, d, e, f, and g (where base station 209 of RAN 1 is shown to serve small cell "d"). The RAN 1 which operates to provide the plurality of small cells 208 is a shared resource with shared access by a plurality of MNOs via the MOCN. The plurality of MNOs having the shared access may include MNO 1 and MNO 2. MNO 1 may be associated with PLMN 1 (or a macro-cellular network) having one or more base stations which serve neighboring macro-cells A1 and B1. MNO 2 may be associated with PLMN 2 (or a macro-cellular network) having one or more base stations which serve neighboring macro-cells A2, B2, and C2. The neighboring macro-cells A1 and B1 may be characterized such that a macro-coverage area of neighboring macro-cell A1 and/or B2 overlaps with or is adjacent to a small-cell coverage area of the small cell "d".

Figure 5B:
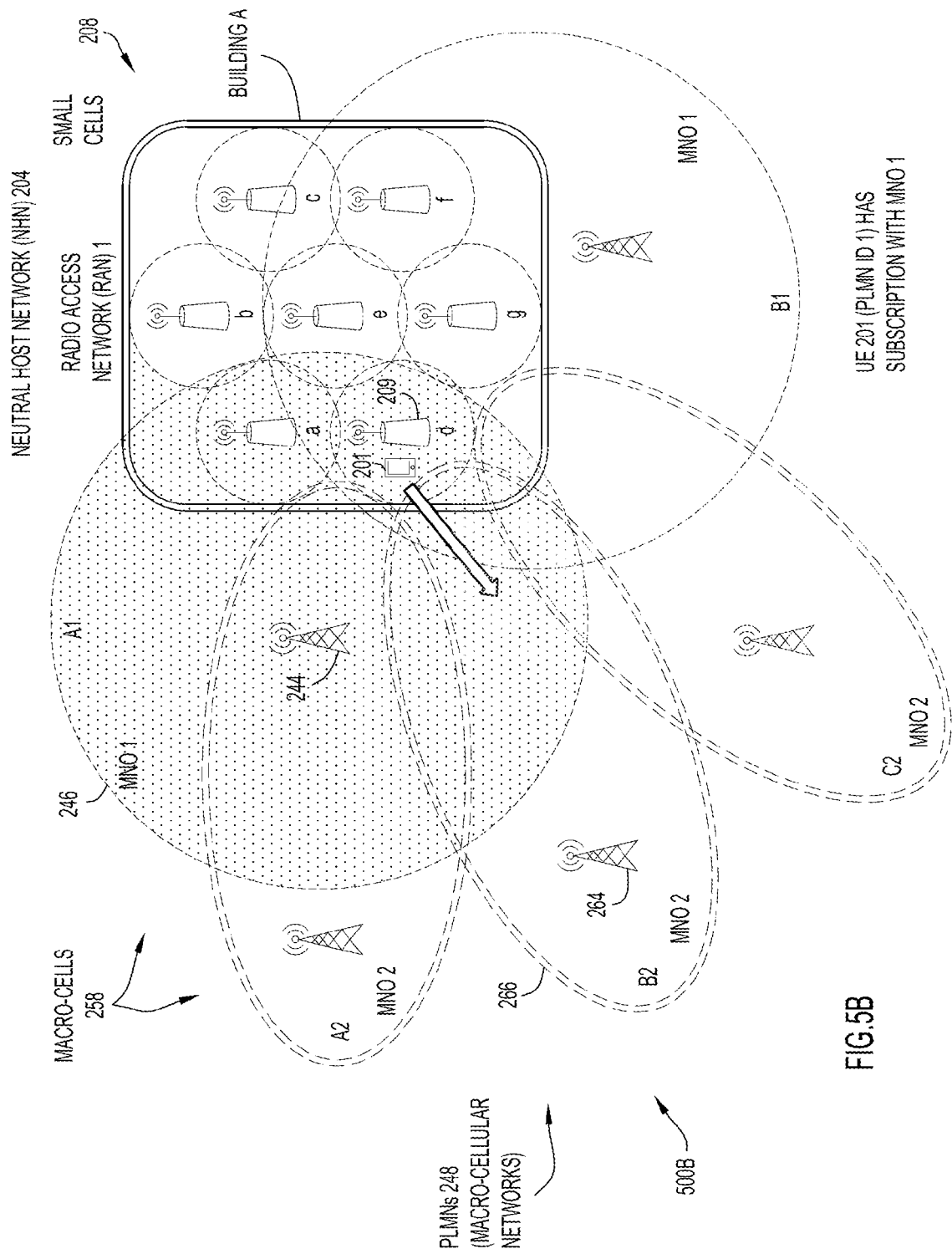
FIG. 5B is an illustrative representation of a communication scenario of the generally top down view of the select relevant portion of the communication system of FIG. 5A, where a UE associated with MNO 1 is handed-over to a macro-cellular network of MNO 1.

With further reference now to FIG. 5B, an illustrative representation 500B of a communication scenario of the select relevant portion of the communication system of FIG. 5A is shown. In FIG. 5B, UE 201 having IMSI 1 (e.g. IMSI 1=PLMN ID 1+MSIN 1) and operative in small cell "d" of base station 209 may be identified to be associated with MNO 1/PLMN ID 1. Accordingly, base station 209 may transmit, to the UE 201 operating in the connected mode, a message (e.g. an RRC connection reconfiguration message) including a selected one of the operator-specific neighbor lists associated with MNO 1/PLMN ID 1 of the UE 201. Here, the macro-cell frequencies of the selected operator-specific neighbor list are associated with neighboring macro-cells A1 and B1 of FIG. 5B. Accordingly, UE 201 may take measurements of the macro-cell frequencies of the neighboring macro-cells A1 and B1 in accordance with its received operator-specific neighbor list. When UE 201 is relocated outside of the RAN 1 of the NHN, it may be handed-over to a base station of a macro-cellular network of MNO 1 in neighboring macro-cell A1 (shown in dotted fill) being served by that base station.

Figure 5C:
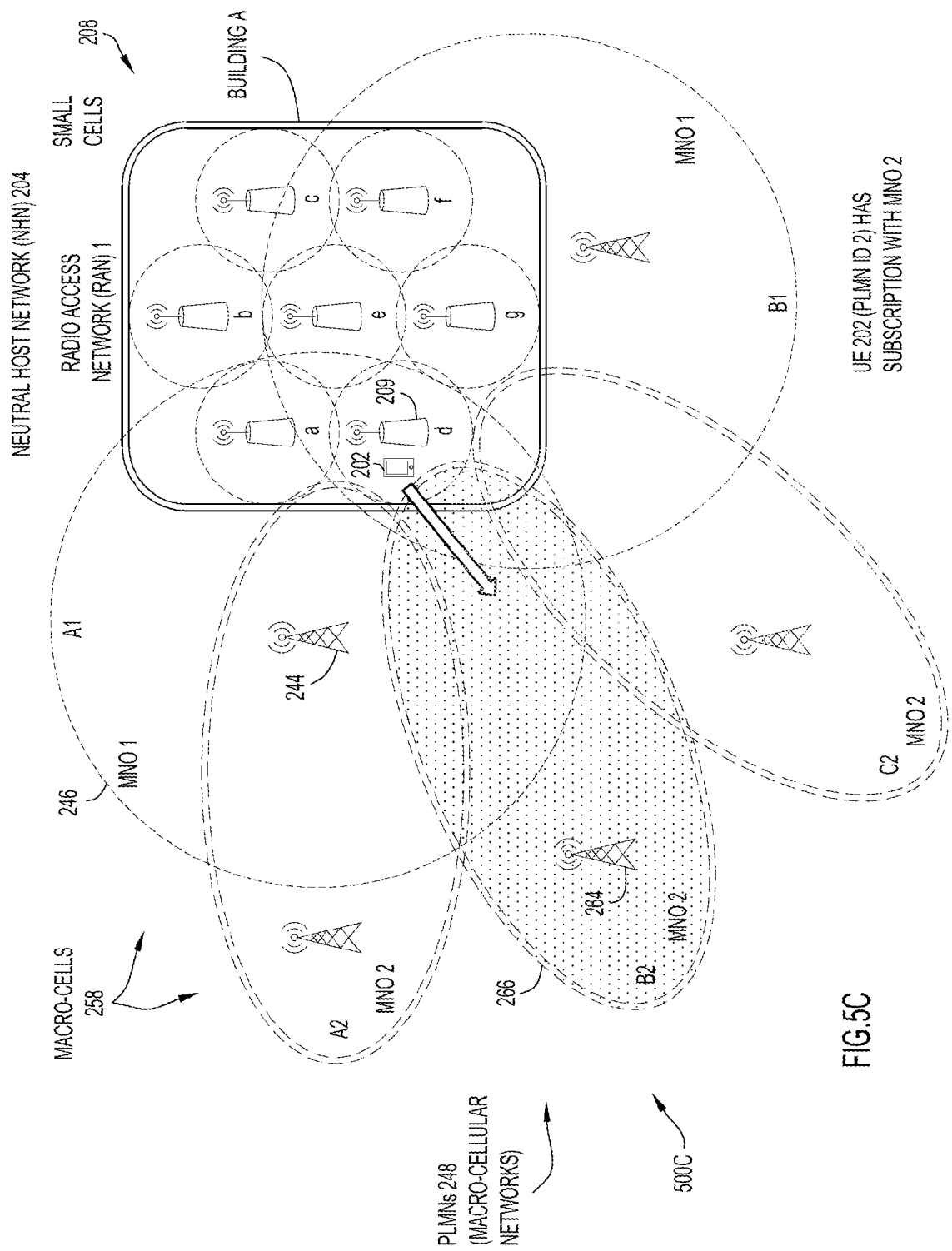
FIG. 5C is an illustrative representation of a communication scenario of the generally top down view of the select relevant portion of the communication system of FIG. 5A, where another UE associated with MNO 2 is handed-over to a macro-cellular network of MNO 2.

With further reference now to FIG. 5C, an illustrative representation 500C of another communication scenario of the select relevant portion of the communication system of FIG. 5A is shown. UE 202 having IMSI 2 (e.g. IMSI 2=PLMN ID 2+MSIN 2) and operative in small cell "d" of base station 209 may be identified to be associated with MNO 2/PLMN ID 2. Accordingly, base station 209 may transmit, to the UE 202 operating in the connected mode, a message (e.g. an RRC connection reconfiguration message) including a selected one of the operator-specific neighbor lists associated with MNO 2/PLMN ID 2 of the UE 202. Here, the macro-cell frequencies of the selected operator-specific neighbor list are associated with neighboring macro-cells A2, B2, and C2 of FIG. 5C. Accordingly, UE 202 may take measurements of the macro-cell frequencies of the neighboring macro-cells A2, B2, and C2 in accordance with its received operator-specific neighbor list. When UE 202 is relocated outside of the RAN 1 of the NHN, in the same or similar manner as UE 201 of FIG. 5B, the UE 202 may be handed-over to a base station of a macro-cellular network of MNO 2 in neighboring macro-cell B2 (shown in dotted fill) being served by that base station.

Figure 3B:
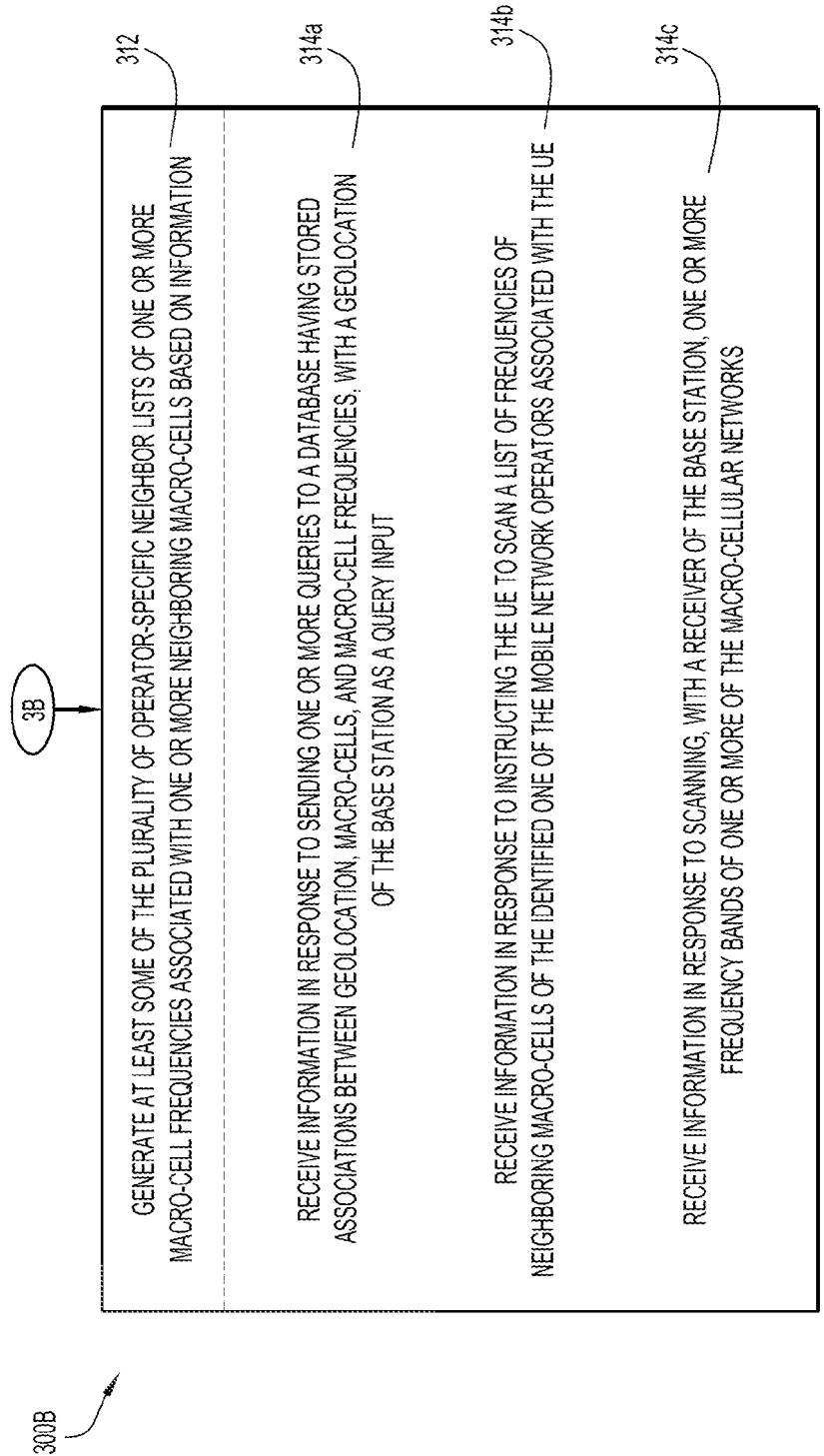
FIG. 3B is a flowchart for describing a method of a base station configured for use in a RAN of an NHN (e.g.

With reference back to FIG. 3A, in some implementations, at least some of the plurality of operator-specific neighbor lists may be received via a connector 3B and generated according one or more techniques described in relation to FIG. 3B.

FIG. 3B is a flowchart 300B for describing a method of a base station configured for use in a RAN of an NHN according to some implementations of the present disclosure. The RAN may operate to provide communications in a plurality of small cells and comprise a shared resource with shared access by a plurality of MNOs via a MOCN. The method may be for use in providing small cell to macro-cell handover of a UE operating in a small cell of the base station (e.g. in a connected mode of operation). More specifically as described above, the method of FIG. 3B may be for use in generating at least some of the plurality of operator-specific neighbor lists of one or more macro-cell frequencies associated with one or more neighboring macro-cells used in the method of FIG. 3A and received via the connector 3B of FIG. 3A. The method may be performed by a base station (or controller or control unit thereof) in the communication system described earlier in relation to FIG. 2. The method of FIG. 3B may be performed for each one of the base stations in the RAN. In some implementations, the base station may be a CBSD operative in a shared spectrum according to a system for shared spectrum access. The method may be embodied in a computer program product which includes a non-transitory computer readable medium and instructions stored in the non-transitory computer readable medium, where the instructions are executable by one or more controllers or processors of the base station.

Beginning at the connector 3B of FIG. 3B, the base station may generate at least some of the plurality of operator-specific neighbor lists of one or more macro-cell frequencies associated with one or more neighboring macro-cells based on information (step 312 of FIG. 3B).

In some implementations, at least some of the plurality of operator-specific neighbor lists may be generated based on information received in response to sending one or more queries to a database having stored associations between geolocation, macro-cells, macro-cell frequencies, with a geolocation of the base station as a query input (step 314*a* of FIG. 3B). The geolocation of the base station may be obtained from a local resource (e.g. a local database, a local storage for a domain proxy for multiple CBRS base stations, etc.) which is already provided for spectrum sharing or CBRS (e.g. the SAS). In some preferred implementations, the database has stored associations between geolocation, mobile network operator or PLMN ID, macro-cells, macro-cell frequencies, where for each operator the geolocation of the base station and the mobile network operator or PLMN ID may be submitted as the query input, for generating at least some of the operator-specific neighbor lists. Relatedly, with reference back to FIG. 2, a database server 270 may operate in connection with a database 272 for query processing, where the database 272 has the stored associations between geolocation, mobile network operator or PLMN ID, macro-cells, and macro-cell frequencies. In some implementations, database 272 may be a central or national cellsite database or repository (see e.g. www.cellmapper.net). Database server 270 and database 272 have a network interface to connect to IP network 230 (or other network) for communications with core network 206 and/or the RANs of NHN 204.

In some implementations, at least some of the plurality of operator-specific neighbor lists may be generated based on information received in response to instructing the UE to scan a list of frequencies of neighboring macro-cells of the identified one of the mobile network operators associated with the UE (step 314*b* of FIG. 3B). In some of these implementations, the information is received in advance, from one or more UEs different from the UE(s) currently being served.

In some implementations, at least some of the plurality of operator-specific neighbor lists may be generated based on information received in response to scanning, with a receiver of the base station, one or more frequency bands of one or more of the macro-cellular networks (step 314*c* of FIG. 3B). In preferred implementations, the base station is a CBRS base station or CBSD having a receiver for scanning that operates in one or more frequency bands of one or more of the macro-cellular networks associated with the MNOs. In such implementations, the receiver for scanning may operate in more than one, most, or all possible frequency bands of the macro-cellular networks associated with the MNOs. For example, the base station which is a CBRS base station or CBSD may have a receiver for scanning at least in the 700 MHz band for PLMN 1 of MNO 1 and in the 2100 MHz band for PLMN 2 of MNO 2, and so on.

In some implementations, at least some of the plurality of operator-specific neighbor lists may be generated based on information received in response to one or more combinations of the techniques described in relation to steps 314*a*, 314*b*, and 314*c* in FIG. 3B.

Figure 6:
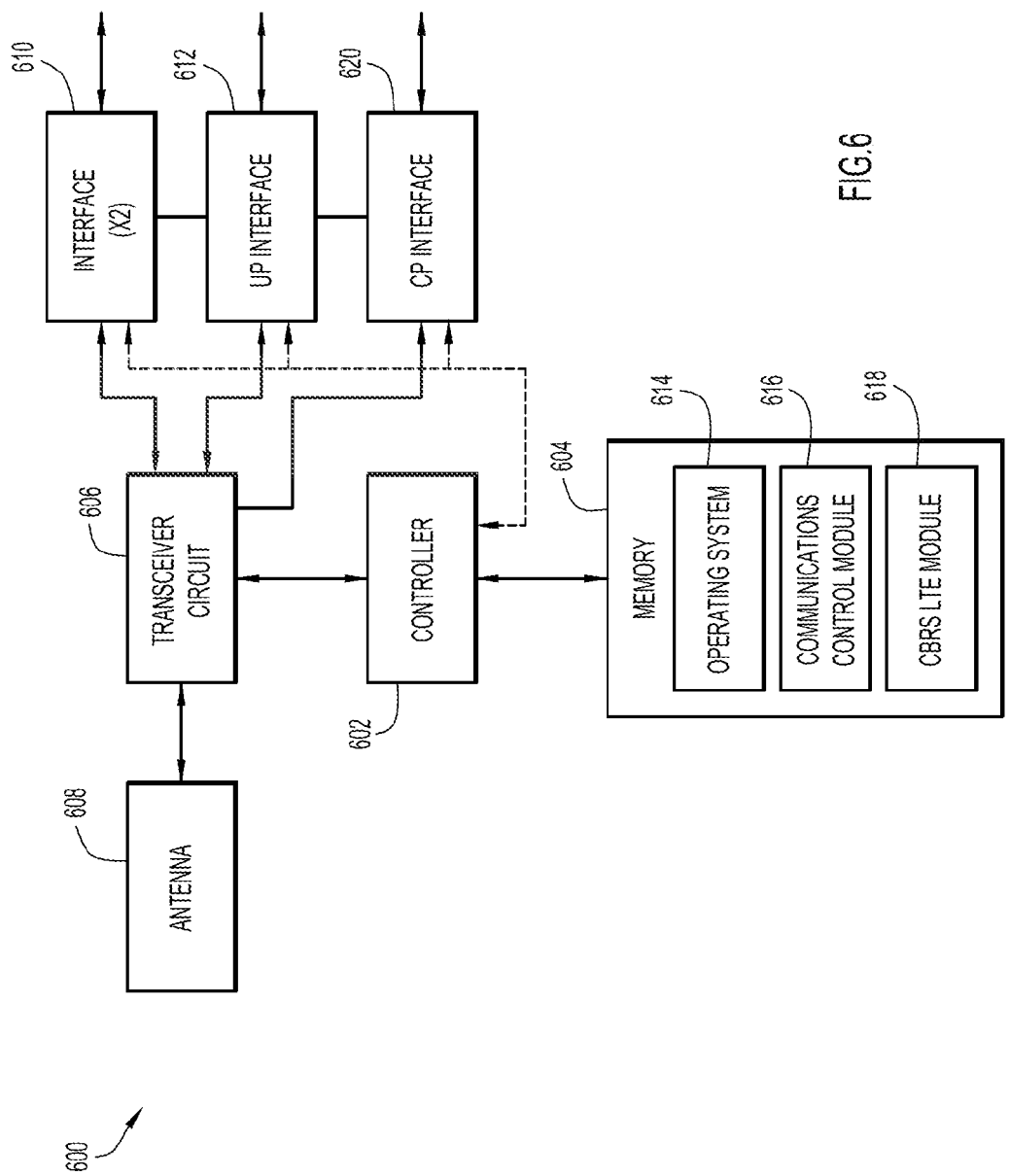
FIG. 6 is a schematic block diagram of relevant components of a base station (e.g. an eNodeB or gNodeB) for use in a RAN of an NHN according to some implementations.

Reference is now made to FIG. 6, which shows an example schematic block diagram of components of a (CBRS) base station 600 (e.g. an eNB or gNB) or CBSD for use in a RAN of an NHN according to some implementations. As shown, base station 600 has a transceiver circuit 606 for transmitting signals to and for receiving signals from the communication devices (such as UEs) via one or more antennas 608. Base station 600 may also have an interface 610 (e.g. an X2 interface) for transmitting signals to and for receiving signals from other base stations. Further, base station 600 may have a user plane (UP) interface 612 for transmitting signals to and for receiving signals from a user plane entity (e.g. a serving gateway-user plane or "SGW-U" or user plane function or "UPF", etc.). Even further, base station 600 may have a control plane (CP) interface 620 for transmitting control signaling to and from a control plane function (e.g. a serving gateway-control plane or "SGW-C," etc.).

Base station 600 also has a controller 602 to control the operation of the base station. Controller 602 is associated with a memory 604. Base station 600 may have all the typical functionality of a CBRS base station, and this may be provided by any one or any combination of hardware, software and firmware, as appropriate. Software may be pre-installed in memory 604 and/or may be downloaded via the network or from a removable data storage device, for example. Controller 602 may be configured to control the overall operation of base station 600 by, in this example, program instructions or software instructions stored within memory 604. As shown, these software instructions include, among other things, an operating system 614, a communications control module 616, a CBRS/LTE module 618, and further instructions for use providing the techniques of the present disclosure.

In basic operation, transceiver circuit 606 is configured to provide radio communications with UEs. Communications control module 616 is configured to control the communication between base station 600 and UEs and other network entities that are connected to base station 600. Communications control module 616 also controls the separate flows of downlink user traffic (via associated data radio bearers) and control data to be transmitted to UEs associated with base station 600 including, for example, control data for core network services and/or mobility of UEs. In some implementations, communications control module 616 may include a neighbor list creation module operative in accordance with techniques of the present disclosure. The CBRS/LTE module 618 is configured to communicate with compatible devices and network nodes using appropriate CBRS/LTE protocols known in the art.

In some implementations, each of the elements of the system may couple to one another through simple interfaces or through any other suitable connection (wired or wireless), which provides a viable pathway for network communications. As referred to herein, a physical (wired or wireless) interconnection or interface may refer to an interconnection of one element or node with one or more other element(s), while a logical interconnection or interface may refer to communications, interactions and/or operations of elements with each other, which may be directly or indirectly interconnected, in a network environment.

Note that the terms 'data', 'information', 'parameters' and variations thereof as used herein may refer to any type of binary, numeric, voice, video, textual or script data or information or any type of source or object code, or any other suitable data or information in any appropriate format that may be communicated from one point to another in electronic devices and/or networks. Additionally, messages, requests, responses, replies, queries, etc. are forms of network traffic and, therefore, may comprise one or more packets.

Note that in some implementations, operations as outlined herein to facilitate techniques of the present disclosure may be implemented by logic encoded in one or more tangible media, which may be inclusive of non-transitory tangible media and/or non-transitory computer readable storage media (e.g. embedded logic provided in an ASIC, in DSP instructions, software—potentially inclusive of object code and source code—to be executed by a processor, or other similar machine, etc.). In some of these instances, a memory element and/or storage may store data, software, code, instructions (e.g. processor instructions), logic, parameters, combinations thereof or the like used for operations described herein. This includes memory element and/or storage being able to store data, software, code, instructions (e.g. processor instructions), logic, parameters, combinations thereof, or the like that are executed to carry out operations described herein.

A controller or processor (e.g. a hardware processor) may execute any type of instructions associated with data to achieve the operations detailed herein. In one example, a processor may transform an element or an article (e.g. data, information) from one state or thing to another state or thing. In another example, operations outlined herein may be implemented with logic, which may include fixed logic, hardware logic, programmable logic, digital logic, etc. (e.g. software/computer instructions executed by a processor), and/or one or more the elements identified herein could be some type of a programmable processor, programmable digital logic (e.g. a field programmable gate array (FPGA), a DSP processor, an EPROM, a controller, an electrically erasable PROM (EEPROM), or an ASIC) that includes digital logic, software, code, electronic instructions, or any suitable combination thereof.

It is also noted that the operations and steps described with reference to the preceding figures illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that the system (and its teachings) are readily scalable and may accommodate a large number of components, as well as more complicated/sophisticated arrangements and configurations. Accordingly, the examples provided should not limit the scope or inhibit the broad teachings of the system as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, the system may be applicable to other exchanges or routing protocols, interfaces, and/or communications standards, proprietary, and/or non-proprietary. Moreover, although the system has been illustrated with reference to particular elements and operations that facilitate the communication process, these elements, and operations may be replaced by any suitable architecture or process that achieves the intended functionality of the system.

Although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

It will also be understood that, although the terms "first," "second," etc. may be used herein to describe various elements, these elements should not be limited by these terms. These terms are used to distinguish one element from another. For example, a first neighbor list could be termed a second neighbor list, and similarly, a second neighbor list could be termed a first neighbor list, without changing the meaning of the description, so long as all occurrences of the "first neighbor list" are renamed consistently and all occurrences of the "second neighbor list" are renamed consistently. The first neighbor list and the second neighbor list are both neighbor lists, but they are not the same neighbor list.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method for a base station configured for use in a radio access network of a neutral host network, the radio access network being operative to provide communications in a plurality of small cells and comprising a shared resource with shared access by a plurality of mobile network operators via a multi-operator core network, the method comprising:
at the base station or a controller thereof,
maintaining a neighbor list of small cell frequencies associated with neighboring small cells of a small cell of the base station, for a user equipment (UE) operative in the small cell of the base station;
broadcasting, to the UE operative in the small cell, a system information message including the neighbor list of small cell frequencies associated with neighboring small cells of the small cell;
maintaining a plurality of operator-specific neighbor lists of one or more macro-cell frequencies associated with one or more neighboring macro-cells, each operator-specific neighbor list being associated with a respective one of a plurality of macro-cellular networks of the plurality of mobile network operators; and
transmitting, to the UE operative in the small cell, a message including a selected one of the operator-specific neighbor lists associated with an identified one of the mobile network operators associated with the UE,
wherein the selected one of the operator-specific neighbor lists is selected for the UE based on a mobile network operator identifier indicated in an identity of the UE.

2. The method of claim 1, wherein transmitting, to the UE operative in the small cell, the message including the selected one of the operator-specific neighbor lists further comprises:
transmitting, to the UE operative in the small cell, a radio resource control (RRC) connection reconfiguration message including the selected one of the operator-specific neighbor lists associated with the identified one of the mobile network operators associated with the UE.

3. The method of claim 1, wherein each entry in the selected one of the operator-specific neighbor lists that is transmitted to the UE includes a frequency channel number of a neighboring macro-cell and one or more of: a physical cell identity of the neighboring macro-cell, a cell global identity of the neighboring macro-cell, a cell individual offset of the neighboring macro-cell, an Internet Protocol (IP) address associated with the neighboring macro-cell, and an X2 connection status indicator associated with the neighboring macro-cell.

4. The method of claim 1, wherein the identity of the UE comprises an International Mobile Subscriber Identity (IMSI) and the mobile network operator identifier comprises a Public Land Mobile Network (PLMN) ID, the method further comprising:
identifying the identified one of the mobile network operators associated with the UE based on identifying the PLMN ID from the IMSI of the UE; and
identifying a match between the PLMN ID and a PLMN ID associated with the selected one of the operator-specific neighbor lists.

5. The method of claim 1, further comprising:
receiving, from the UE, a message indicating an attach request and including an International Mobile Subscriber Identity (IMSI) of the UE, for identifying the mobile network operator identifier of the identified one of the mobile network operators associated with the UE.

6. The method of claim 1, further comprising:
generating at least some of the plurality of operator-specific neighbor lists of one or more macro-cell frequencies associated with one or more neighboring macro-cells based on information received in response to sending one or more queries to a database having stored associations between geolocation, macro-cells, and macro-cell frequencies, with a geolocation of the base station as a query input.

7. The method of claim 1, further comprising:
generating at least some of the plurality of operator-specific neighbor lists of one or more macro-cell frequencies associated with one or more neighboring macro-cells based on information received in response to instructing the UE to scan a list of frequencies of neighboring macro-cells of the identified one of the mobile network operators associated with the UE.

8. The method of claim 1, further comprising:
generating at least some of the plurality of operator-specific neighbor lists of one or more macro-cell frequencies associated with one or more neighboring macro-cells based on information received in response to scanning, with a receiver of the base station, one or more frequency bands of one or more of the macro-cellular networks.

9. The method of claim 1, wherein the selected one of the operator-specific neighbor lists associated with the identified one of the mobile network operators associated with the UE comprises a first selected one of the operator-specific neighbor lists associated with a first identified one of the mobile network operators associated with the UE, and the mobile network operator identifier indicated in the identity of the UE comprises a first mobile network operator identifier indicated in a first identity of the UE, the method further comprising:
transmitting, to another UE operative in the small cell of the base station, a message including a second selected one of the operator-specific neighbor lists associated with a second identified one of the mobile network operators associated with the other UE,
wherein the second selected one of the operator-specific neighbor lists is selected for the other UE based on a second mobile network operator identifier indicated in a second identity of the other UE.

10. The method of claim 1, wherein:
the base station or the controller thereof comprises a control unit (CU) which performs at least part of the method, and
the selected one of the operator-specific neighbor lists of one or more macro-cell frequencies associated with one or more neighboring macro-cells is for small cell to macro-cell handover of the UE.

11. A base station configured for use in a radio access network of a neutral host network, wherein the radio access network is operative to provide communications in a plurality of small cells and comprises a shared resource with shared access by a plurality of mobile network operators via a multi-operator core network, the base station comprising:
a controller;
a transceiver circuit configured to provide radio communications;
the controller being configured to:
maintain a neighbor list of small cell frequencies associated with neighboring small cells of a small cell of the base station, for a user equipment (UE) operative in the small cell of the base station;
cause a system information message to be broadcasted to the UE operative in the small cell in a connected mode of operation, the system information message including the neighbor list of small cell frequencies associated with neighboring small cells of the small cell;
maintain a plurality of operator-specific neighbor lists of one or more macro-cell frequencies associated with one or more neighboring macro-cells, each operator-specific neighbor list being associated with a respective one of a plurality of macro-cellular networks of the plurality of mobile network operators; and
cause a radio resource control (RRC) connection reconfiguration message to be transmitted to the UE operative in the small cell in the connected mode of operation, the RRC connection reconfiguration message including a selected one of the operator-specific neighbor lists associated with an identified one of the mobile network operators associated with the UE.

12. The base station of claim 11, wherein
the selected one of the operator-specific neighbor lists is selected for the UE based on a mobile network operator identifier indicated in an identity of the UE.

13. The base station of claim 12, wherein the identity of the UE comprises an International Mobile Subscriber Identity (IMSI) and the mobile network operator identifier comprises a Public Land Mobile Network (PLMN) ID, and wherein the controller is further configured to:
identify the identified one of the mobile network operators associated with the UE based on identifying the PLMN ID from the IMSI of the UE.

14. The base station of claim 11, wherein the controller is further configured to:
generate at least some of the plurality of operator-specific neighbor lists of one or more macro-cell frequencies associated with one or more neighboring macro-cells based on information received in response to sending one or more queries to a database having stored associations between geolocation, mobile network operator, macro-cells, and macro-cell frequencies, with a geolocation of the base station and mobile network operator as a query input.

15. The base station of claim 11, wherein the controller is further configured to:
generate at least some of the plurality of operator-specific neighbor lists of one or more macro-cell frequencies associated with one or more neighboring macro-cells based on information received in response to instructing the UE to scan a list of frequencies of neighboring macro-cells of the identified one of the mobile network operators associated with the UE.

16. The base station of claim 11, wherein the base station is operative in a shared spectrum according to a system for shared spectrum access, and the controller is further configured to:
generate at least some of the plurality of operator-specific neighbor lists of one or more macro-cell frequencies associated with one or more neighboring macro-cells based on information received in response to scanning, with a receiver of the base station, one or more frequency bands of one or more of the macro-cellular networks.

17. A computer program product comprising:
a non-transitory computer readable medium;
instructions stored in the non-transitory computer readable medium, the instructions being executable by one or more processors of a base station or a controller thereof in a neutral host network comprising a radio access network (RAN) operative to provide communications in a plurality of small cells and being a shared resource with shared access by a plurality of mobile network operators via a multi-operator core network, for:
maintaining a neighbor list of small cell frequencies associated with neighboring small cells of a small cell of the base station, for a user equipment (UE) operative in the small cell of the base station;

causing a system information message to be broadcasted to the UE operative in the small cell, the system information message including the neighbor list of small cell frequencies associated with neighboring small cells of the small cell;

maintaining a plurality of operator-specific neighbor lists of one or more macro-cell frequencies associated with one or more neighboring macro-cells, each operator-specific neighbor list being associated with a respective one of a plurality of macro-cellular networks of the plurality of mobile network operators; and causing a message to be transmitted to the UE operative in the small cell, the message including a selected one of the operator-specific neighbor lists associated with an identified one of the mobile network operators associated with the UE, wherein the selected one of the operator-specific neighbor lists is selected for the UE based on a mobile network operator identifier indicated in an identity of the UE.

18. The computer program product of claim 17, wherein the instructions are executable by the base station or controller thereof for causing the message including the selected one of the operator-specific neighbor lists to be transmitted to the UE by:

causing a radio resource control (RRC) connection reconfiguration message to be transmitted to the UE operating in a connected mode, the RRC connection reconfiguration message including the selected one of the operator-specific neighbor lists associated with the identified one of the mobile network operators associated with the UE.

19. The computer program product of claim 17, wherein the identity of the UE comprises an International Mobile Subscriber Identity (IMSI) and the mobile network operator identifier comprises a Public Land Mobile Network (PLMN) ID, wherein the instructions are executable by the base station or controller thereof further for:

identifying the identified one of the mobile network operators associated with the UE based on identifying the PLMN ID from the IMSI of the UE.

20. The computer program product of claim 17, wherein the instructions are executable by the base station or controller thereof further for:

generating at least some of the plurality of operator-specific neighbor lists of one or more macro-cell frequencies associated with one or more neighboring macro-cells based on information received in response to sending one or more queries to a database having stored associations between geolocation, mobile network operator, macro-cells, and macro-cell frequencies, with a geolocation of the base station and mobile network operator as a query input, or generating at least some of the plurality of operator-specific neighbor lists of one or more macro-cell frequencies associated with one or more neighboring macro-cells based on information received in response to instructing the UE to scan a list of frequencies of neighboring macro-cells of the identified one of the mobile network operators associated with the UE, or generating at least some of the plurality of operator-specific neighbor lists of one or more macro-cell frequencies associated with one or more neighboring macro-cells based on information received in response to scanning, with a receiver of the base station, one or more frequency bands of one or more of the macro-cellular networks.

* * * * *